United States Patent [19] [11] 4,311,823
Imai et al. [45] Jan. 19, 1982

[54] PROCESS FOR PRODUCING AROMATIC POLYESTERS

[75] Inventors: Shozaburo Imai, Akashi; Haruo Suzuki, Ibaraki; Kuniaki Asai, Tondabayashi; Katsuji Ueno, Hirakata, all of Japan

[73] Assignee: Sumitomo Chemical Company Limited, Osaka, Japan

[21] Appl. No.: 108,951

[22] Filed: Dec. 31, 1979

[30] Foreign Application Priority Data

Jan. 10, 1979 [JP] Japan ................... 54/2010

[51] Int. Cl.³ ............................................. C08G 63/60
[52] U.S. Cl. .................................... 528/181; 528/193; 528/194
[58] Field of Search ......................... 528/181, 193, 194

[56] References Cited

U.S. PATENT DOCUMENTS

| 2,600,376 | 6/1952 | Caldwell | 260/47 |
| 2,728,747 | 12/1955 | Aelong et al. | 260/78.3 |
| 3,637,595 | 1/1972 | Collis | 260/47 |
| 3,759,870 | 9/1973 | Economy et al. | 260/47 |
| 3,767,621 | 10/1973 | Suyaki et al. | 260/47 |
| 3,857,814 | 12/1974 | Economy | 528/193 |
| 3,980,749 | 9/1976 | Cottis et al. | 264/331 |
| 4,219,629 | 8/1980 | Storm | 528/193 |

FOREIGN PATENT DOCUMENTS

| 2300150 | 9/1976 | France . |
| 2339636 | 8/1977 | France . |
| 51-1054690 | 5/1976 | Japan . |
| 1544143 | 4/1979 | United Kingdom . |
| 2006239 | 5/1979 | United Kingdom . |

Primary Examiner—Maurice J. Welsh
Attorney, Agent, or Firm—Stevens, Davis, Miller & Mosher

[57] ABSTRACT

In a process for producing aromatic polyesters by bulk condensation of polyester forming reactant the improvement which comprises using three reaction vessels, reacting a reactant compound with an acid anhydride to effect an alkanolylation reaction in the first reaction vessel to thereby prepare a monomer, removing the acids by-produced in said reaction, forming or not forming an oligomer from a part or whole of said monomer, then transferring the reaction product of the first vessel into the second reaction vessel, polycondensing said monomer and/or oligomer to produce a prepolymer in the second reaction vessel, transferring the reaction product of the second vessel into the third reaction vessel, and heating said prepolymer in said third reaction vessel, thereby obtaining an aromatic polyester of high polymerization degree.

6 Claims, No Drawings

PROCESS FOR PRODUCING AROMATIC POLYESTERS

This invention relates to an improved process for producing aromatic polyesters by means of bulk polycondensation.

Heretofore, solution polycondensation as proposed in Japanese Pat. Pub. No. 47870/72 has been popularly used for the production of aromatic polyesters. Such solution polycondensation, however, involves the troublesome after-treatments such as solvent removal, washing of the polymer and the like, so that a new process by means of bulk polycondensation, which is free of said problems, has been needed.

As a process for obtaining oxybenzoyl polyester, for instance, there is known a method in which hydroxybenzoic acid and a diol are alkanoylated and polycondensed with deacetylation. Such method, however, involves the problem of a sharp rise of melt viscosity in accordance with an increase of polymerization degree because of high reaction rate, and selection of the material of the reactor which is required to withstand corrosion by acetic acid at high temperatures, particularly when an acetoxy compound is used. For these reasons, production of the polyesters by bulk polycondensation employing the alkanoylation process has not been realized.

The present inventors found a bulk polycondensation process which is effected in a short-time and with rationalized production of said polyesters by rather taking advantage of high reaction rate in the alkanoylation process.

That is, this invention provides a process for producing aromatic polyesters represented by the general formula (I):

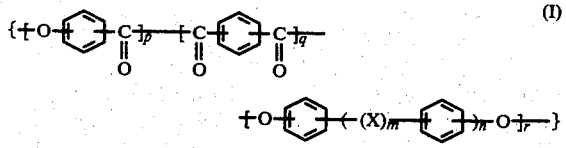

(wherein X is —O—, —SO$_2$—, —S— or —CO—, m and n are each 0 or 1, and when p=0, q+r=3 to 600, and when q=r=0, p=3 to 600 and when all of p, q and r are not zero, p+q+r=3 to 600) by (1) bulk polycondensation of a compound represented by the general formula (II):

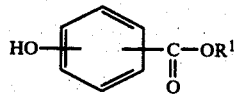

(wherein $R^1$ is hydrogen, benzyl, a lower alkyl or phenyl), or (2) bulk condensation of a compound represented by the general formula (III):

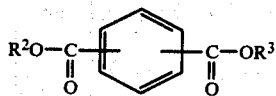

(wherein $R^2$ and $R^3$ are individually hydrogen, benzyl, a lower alkyl or phenyl), with a compound represented by the general formula (IV):

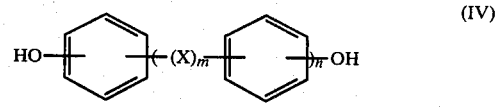

(wherein X, m and n are as defined above), or (3) by polycondensation of compounds (II), (III), and (IV) characterized by using three reaction vessels, reacting the compounds recited in steps (1), (2) or (3) with an acid anhydride to effect an alkanoylation reaction in the first reaction vessel to thereby prepare a polycondensable compound (referred to as "monomer" hereinafter), removing the acids by-produced in said reaction, forming or not forming an oligomer from a part or whole of said monomer, then transferring the reaction product of the first vessel into the second reaction vessel, polycondensing said monomer and/or oligomer to produce a prepolymer in the second reaction vessel, transferring the reaction product in the second vessel into the third reaction vessel, and heating said prepolymer in said third reaction vessel thereby obtaining a polycondensate having high polymerization degree.

Thus, this invention provides a novel process for producing the polycondensates (referred to as "polymer" hereinafter), which are increased in melt viscosity during the time of polycondensation (referred to as "polymerization" hereinafter), by making use of the bulk polymerization process, and according to this process, the series of operations from monomer reaction to formation of a high polymer can be accomplished half-continuously owing to a rational combination of the operations.

In a preferred embodiment of this invention, for example, acetic anhydride is fed together with the compounds represented by the formulae (II) to (IV), for example, a dicarboxylic acid, a hydroxybenzoic acid and a diol into the first reaction vessel to effect a reaction for acetylating the OH group in the compound. After the acetylation reaction, there exist in the system the unreacted dicarboxylic acid, acetylated hydroxybenzoic acid, acetylated diol, acetic acid and an excess amount of acetic anhydride. Of these materials, the acetic acid and excess acetic anhydride are removed. If necessary, a part or whole of the monomer is turned into an oligomer by deacetylation. Preferably, this reaction is carried out at a temperature of up to about 280° C., preferably about 150° to about 280° C. and the reaction product with a melt viscosity of not higher than 5,000 poises is transferred into the next reaction vessel. A reactor equipped with stirring means having high stirring power is used as the second reaction vessel, and in some cases, the polymerization degree is further increased in a molten state thereby obtaining a prepolymer. In still other case, a higher polymerization degree is attained from the molten state so that a solid dispersion is formed ultimately, thereby obtaining a prepolymer. In the case of the operation for producing a prepolymer in a molten state in the second reaction vessel, an extruder is preferably installed in the second reaction vessel to pelletize the prepolymer. The pelletized prepolymer is transferred into the third reaction vessel. In the case where a solid dispersion is formed in the second reaction vessel, such dispersion is transferred as such into the third stage reaction vessel, or pelletized by an extruder and then supplied into the third stage reaction vessel. Needless to say, if the prepolymer is in the form of solid dispersion, transfer thereof can be accomplished in a short time and also, because of no change in polymerization degree during transfer, it can be pelletized under a constant condition.

The reaction in the third reaction vessel is intended to increase the polymerization degree to a level that can provide the polymer with a sufficient strength. In this invention, it is necessary to increase the polymerization degree while maintaining the prepolymer in a solid phase at a condensationable temperature, preferably in a short time by raising the temperature so as not to cause fusion and adhesion of the pellets and solid dispersion.

The respective reactions are carried out in stages and the desired temperature, rotational torque of stirring means and the type of the reaction vessel are suitably selected for each stage of reaction. One of the important features of this invention is that the monomer and/or oligomer produced in the first reaction vessel maintain a viscosity which allows easy transfer and that the capacity of the second reaction vessel can be minimized.

The second reaction vessel needs to be equipped with stirring means having a high shearing force, and minimization of its capacity is an important factor for facilitating the reaction from the viewpoints of heat conduction and stirring power.

The reaction in each stage will be described in detail below. The reaction in the first vessel is an alkanoylation reaction, for which any known method capable of alkanoylating the OH group may be applied. Acetylation with acetic anhydride is most preferred. The acetylation reaction can be carried out under reflux at about 150° C. and the acetylation degree is preferably not less than 95%. The acetylation time is preferably more than 3-hour. A conventional reaction vessel may be used for this first stage reaction, particularly, a glass-lined vessel is preferred because of its economy. High-pressure steam may be employed for effecting heating. After acetylation, acetic acid and excess acetic anhydride are removed and preferably the acetylated product is further deacetylated to form an oligomer which is can be easily transfered to the second reaction vessel thereby minimizing the vessel capacity. The resulting product is easily pressure-transferred into the second vessel by pressurized $N_2$ in a short time. The system temperature till the transfer operation is preferably controlled as low as possible, but there are cases where the temperature needs to be raised up to about 280° C. In such case, it is recommended to use a heat- and impact-resistant glass lining such as, for example, Nucerite ® or an anticorrosive material such as tantalum, or nickel-copper alloys (such as Monel) for the reaction vessels. Further, it was found that nickel-molybdenum-iron alloys (such as Hastelloy B) can be used. Use of a heat- and impact-resistant glass lining is must economical.

The reaction in the second vessel is one in which there takes place a sudden rise of viscosity as the polymerization degree increases. In case the polymerization is to be carried out in a molten state to the end, it is most desirable to use a kneader, particularly a twin-screw kneader with a high shearing performance. In a preferred method of reaction, while applying a shearing force at a temperature below the fusing point of the polymer, the polymerization is performed until substantially all of the reaction mixture is brought into a solid dispersion. According to this method, the reaction mixture is initially in a molten state and is polymerized by raising the temperature. When the polymerization degree reached a certain level (which allows stirring of the melt), the polymerization is thereafter carried out at a lower heating rate than rise of the fusing temperature of the polymer, or the temperature is kept constant and a sufficient shearing force is given to allow the polymerization. The term "fusing temperature" referred to in this specification means the lower limit temperature at which the individual particles of such solid dispersion are fused to each other. Such fusing temperature may be determined, for example, by previously forming a polymer having the desired polymerization degree (any suitable polymerization method may be used), crushing such polymer into a solid dispersion, heating it and measuring the lowest temperature at which the particles of said solid dispersion are fused to each other. The "solid dispersion" means a state of dispersion such as powder or flakes. In practicing this method, it is desirable to apply stirring power of 0.75 to 100 $KW/m^3$ although such range is not limited. The optimum rate of stirring may be suitably determined case by case as it varies depending on the type of the polymer treated, but usually, in the case of a polymer with a high degree of crystallization, the object can be attained by applying a relatively low stirring power. The second reaction vessel is preferably selected from those of the stirring vessel type equipped with a stirring means usually used in high-viscosity liquid phase reactions, such as anchor type, multi-stage anchor type, helical ribbon type, helical shaft type and modifications thereof, or the mixers having a higher kneading performance, such as Werner mixer, Banbury mixer, pony mixer, Muller mixer and roll mill, or those capable of continuous operation, such as Ko-kneader, pug mill and gear compounder, though the above are merely illustrative. As for the material of the vessel, it is here impossible to use a glass-lined vessel, and hence usually tantalum or nickel-copper alloys (such as Monel) are used. Further, it was found that nickel-molybdenum-iron alloys (such as Hastelloy B) are particularly preferred. For the heating system, there may be employed oil heating, electric heating, dielectric heating or the like. The polymerization temperature is usually within the range of 180° to 360° C., preferably 230° to 350° C.

In the reaction of the third vessel, in case the polymerization has been conducted in a molten state to the end in the second vessel, the crusher is connected to the second reaction vessel to crush the prepolymer, and the temperature of the crusher is kept fairly lower than the polymerization temperature for effecting solidification. Or the extruder is connected to effect pelletization. In the case of a solid dispersion, it is directly transferred into the third reaction vessel. In some cases, the extruder is directly connected to effect pelletization and the pelletized material is transferred into the third reaction vessel. In the third stage reaction vessel, the solid dispersion obtained in the second stage is heated in a temperature range causing no fusion of the dispersion and is polymerized to a degree that provides sufficient strength. Solid phase polymerization under reduced pressure is recommended in some cases. Polymerization under $N_2$ atmosphere may be carried out for more easy advancement of polymerization. When no $N_2$ atmosphere is required, dry air may be flowed to allow easy attainment of a high polymerization degree, particularly when a cross-linked polymer is to be obtained. The reaction vessel used for the solid phase polymerization may be, for example, a multi-stage type oven, a rotary oven or an ordinary stirring type reactor. In the case of pellets, it is advised to raise the temperature under reduced pressure to obtain polymer of high molecular weight. In this case, the pellet diameter is preferably 2 mm or less for performing the reaction as uniformly as possible. Even in the case of pellets, it is desirable to form the pellets from a solid dispersion by using an extruder as it allows constant setting of the extruder conditions. The reaction vessel may be made of the same material as used for the second reaction vessel. The polymerization temperature is 200°–400° C., preferably 250°–380° C.

Examples of the compounds of the formula (II) used in this invention are parahydroxybenzoic acid, metahydroxybenzoic acid, 3,5-dimethyl-4-hydroxybenzoic acid, etc.

The compounds of the formula (III) include isophthalic acid, terephthalic acid, 2-methylterephthalic acid, diphenyl terephthalate, diethyl isophthalate, methyl ethyl terephthalate, isobutyl half ester of terephthalic acid, etc. Examples of the compounds of the formula (IV) are hydroquinone, resorcinol, 4,4'-dihydroxybiphenyl, 4,4'-oxybiphenol, 4,4'-thiobiphenol, 4,4'-dihydroxy diphenylsulfone, chloro-substituted hydroquinone, and bis(4-hydroxyphenyl)ketone.

Examples of the lower alkanoylic anhydrides used for the alkanolylation of the formulae (II) and (IV) in the first stage reaction are acetic anhydride, propionic anydride, butyric anhydride, isobutyric anhydride, etc. The reaction is carried out under reflux of the acid anhydride or the produced acid, for example, at a temperature of about 130° to about 150° C. when acetylation is performed with acetic anhydride.

The obstacle to commercialization of the conventional bulk polycondensation methods through alkanoylation has been the problem of material to be used for the reaction vessel. In case, for instance, the polycondensation reaction is carried out by effecting acetylation with acetic anhydride, followed by deacetylation, it is impossible to use a glass-lined vessel because polycondensation is performed at an elevated temperature while applying a high shearing force under the condition of high melt viscosity, particularly in the second reaction. Also, no effective mesures have been available against possible corrosion by acetic acid under a high-temperature operation, usually 180°–360° C., preferably 230°–350° C. (in the reaction at, for instance, 250° C., a small quantity of acetic anhydride is contained). Although availability of very expensive noble metals such as tantalum as anticorrosive vessel material could be conceived, not even an estimation could be made for the materials which are not so costly and can well be utilized industrially. Further, the produced aromatic polyesters are sensitive to thermal degradation when a metal such as Na, K, Fe, Ni, Cr or the like is mixed therein. It is essential to prevent mixing of a metal in bulk polycondensation since no washing step is incorporated. When a corrosion test was conducted by using 100% acetic acid alone under the conditions of 250° C., 20 atm. and 50 hours, the following results were obtained: in the case of SUS 316, corrosion occured at the rate of 3.64 g/m$^2$ hr in the gaseous phase portion and 6.64 g/m$^2$ hr in the liquid phase portion; in the case of Hastelloy B (a nickel-molybdenum-iron alloy), the corrosion rate was 0.0357 g/m$^2$ hr in the gaseous phase portion and 0.0647 g/m$^2$ hr in the liquid phase portion; and in the case of Hastelloy C (a nickel-molybdenum-iron alloy), corrosion took place at the rate of 0.0513 g/m$^2$ hr in the gaseous phase portion and 0.217 g/m$^2$ hr in the liquid phase portion. These results suggested involvement of the problem of metal contamination. However, when the actual polycondensation reaction was carried out by using the three-stage reaction vessels made of nickel-molybdenum-iron alloys, there took place, quite unexpectedly, only a small amount of metal elution and thermal degradation of the aromatic polyester was almost equal to or even less than that which occured when the same operation was performed by using the tantalum reaction vessels. This result points to the availability of said alloys as reaction vessel material in spite of the fact that they include metals which do harm to said polyesters. This finding paved the way for commercialization of bulk polycondensation of said polyesters. Use of said alloys also made it possible to employ all types of heating systems such as steam heating, oil heating, electric heating, dielectric heating, etc., for the reaction. The polyesters obtained in this invention can be easily washed away from the reaction vessels by using an alkaline solution (hot). Therefore, the vessel material needs to have a certain degree of alkaline resistance, and in this respect, said nickel-molybdenum-iron alloys proved to be better than tantalum. Thus, said alloys are the material best suited for bulk polycondensation of said polyesters. That is, as a material of at least the second reaction vessel in this invention, nickel-molybdenum-iron alloys having a composition comprising 48 to 80% by weight of nickel, 15 to 35% by weight of molybdenum and 1 to 10% by weight of iron are preferably used. And when higher acid resistance is required, the alloys may further contain up to 20% by weight of chromium and up to 10% by weight of tungsten.

In the process of this invention, it is possible to add necessary stabilizers, coloring agents, fillers and the like to the reaction system. Particularly, addition of a filler to a polymerization system which is usually not easily incorporated into a solid dispersion proves to be greatly helpful in attaining the object of this invention because addition of such filler facilitates formation of a solid dispersion. Examples of the fillers usable in this invention are silica, powdered quartz, fumed silica, silicon carbide, aluminum oxide, tin oxide, iron oxide, zinc oxide, amorphous carbon, graphite, sand and glass fiber, etc. Pigments such as titanium oxide and other inorganic pigments may be also used.

The invention is now described in further detail by way of the following examples which are merely intended to show some preferred embodiments of the invention and not to be construed as limiting the scope of the invention.

EXAMPLE 1

Into a 30-liter reactor with heat- and impact-resistant glass lining (Nucerite ®) were charged 2.76 kg of parahydroxybenzoic acid, 3.32 kg of terephthalic acid, 2.24 kg of hydroquinone and 6.73 kg of acetic anhydride under nitrogen atmosphere, and the mixture was refluxed at 150° C. for 5 hours and acetic acid and acetic anhydride were distilled off by increasing the temperature, and as the temperature reached 250° C., the mixture was maintained at this temperature for 30 minutes. The melt was then put into a 15-liter Hastelloy B-made reactor provided with multi-stage stirring blades and multi-stage baffles, said reactor having been preheated to 250° C. and placed in a nitrogen atmosphere. The melt was heated therein under high-degree shearing to get rid of acetic acid and further heated to 300° C. At this point, a rise of torque was observed. The molten mixture was further subjected to 3-hour polymerization under vigorous agitation, whereby the molten mass in the reactor was perfectly powdered. The obtained powder was transferred into a 15-liter Hastelloy B-made rotary oven, heated gradually from 330° C. to 390° C. by spending 4 hours under nitrogen stream, then cooled to 200° C. and discharged out of the reactor. A differential thermal analysis of the obtained polymer showed a weak heat absorption at around 405° C., and the weight loss of 3-hour heating at 400° C. was 6.2% by weight. When the polymer was compression-molded at 450° C. under 500 kg/cm$^2$, it showed flexural strength of 510 kg/cm$^2$.

EXAMPLE 2

Into a 30-liter Hastelloy B reactor were charged 5.52 kg of para-hydroxybenzoic acid, 3.32 g of terephthalic acid, 3.72 kg of 4,4′-dihydroxybiphenyl and 9.16 kg of acetic anhydride in a nitrogen atmosphere, and the mixture was refluxed at 150° C. for 3 hours. Acetic acid and acetic anhydride were removed by further heating the mixture, and as the temperature reached 260° C., the mixture was maintained at this temperature for 30 minutes. The melt was then put into a 20-liter Hastelloy B twin-screw kneader which has been preheated to 260° C. and placed in a nitrogen atmosphere. The melt was heated under strong shearing to remove acetic acid and further heated to 330° C. A rise of torque was observed at this point. The mixture was further subjected to 3-hour polymerization under vigorous stirring, cooled gradually to 200° C. while continuing vigorous stirring, then transferred into a 30-liter rotary oven, heated gradually to 360° C. over a period of 6 hours under nitrogen circulation, then cooled to 200° C. and discharged out of the oven in the form of powder. The obtained polymer amount was 10.5 kg (yield: 93%). The Ni, Fe, Mo and Cr contents in the polymer were less than 1 ppm, 14.6 ppm, less than 1 ppm and less than 1 ppm, respectively. (Ni, Fe, Mo and Cr in the monomer were 14.4 ppm, 19.8 ppm, less than 1 ppm and less than 1 ppm, respectively). The weight loss of 3-hour heating at 380° C. was 1.2% by weight. The weight loss was 1.3% in case of using a tantalum-made reactor. The temperature required for providing a flow rate of $1 > 10^{-2}$ cm$^3$/sec through the 1 mm$^2$ nozzle of a Koka type flow tester under load of 100 kg/cm$^2$ was 385° C. Injection molding at 390° C. gave a tensile strength of 1,053 kg/cm$^2$.

Said mixture was polymerized at 330° C. for 3 hours in the second vessel, and by connecting a twin-screw extruder, the mixture was extruded into a 2 mm diameter strand, which was cut and pelletized. The pellets were put into a 30-liter rotary oven under reduced pressure, heated gradually from room temperature to 370° C. over a period of 10 hours, then cooled to 200° C. and taken out of the oven. The obtained pellets were powdered and its flow rate was measured in the 1 mm$^2$ nozzle of a Koka type flow tester under 100 kg/cm$^2$ loading. The result showed that the temperature required for providing a flow rate of $1 \times 10^{-2}$ cm$^3$/sec was 383° C. When the pellets were injection-molded at 390° C., the molded piece showed tensile strength of 902 kg/cm$^2$.

EXAMPLE 3

Into a 30-liter Hastelloy B reactor were fed 13.80 kg of para-hydroxybenzoic acid and 11.20 kg of acetic anhydride under nitrogen atmosphere, and the mixture was refluxed at 150° C. for 2 hours. Acetic acid and acetic anhydride were distilled off under further heating, and as the temperature reached 220° C., the mixture was maintained at this temperature for 30 minutes and acetic acid and the unreacted acetic anhydride were removed. The melt was flowed into a 20-liter Hastelloy B twin-screw kneader which had been preheated to 230° C. and placed under a nitrogen atmosphere, and further heated under high-degree shearing to distill off the acetic acid. As the temperature reached 290° C., a rise of stirring torque was observed and it was confirmed that the molten mass was being powdered. The reaction was further continued at 290° C. for one hour to reduce the powder particle size as much as possible. After the temperature was cooled to 200° C., the powder was transferred into a 30-liter rotary oven, heated to 370° C. for 2 hours, maintained at this temperature for an additional 2 hours, then cooled to 200° C. and taken out of the oven. The reaction time at each stage was set at 5 hours, and 10.2 kg of a high polymer (with number-average molecular weight of 21,000) was obtained from every 5-hour reaction. A thermogravimetric analysis showed a weight loss of 5% by weight at 518° C. It was 5% by weight at 510° C. when tantalum was used for the second reaction vessel.

What is claimed is:

1. In a process for producing an aromatic polyester represented by the general formula (I):

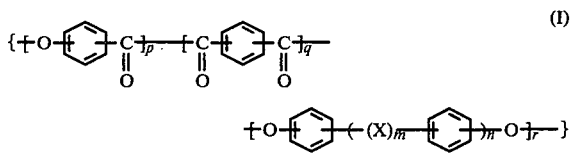

(I)

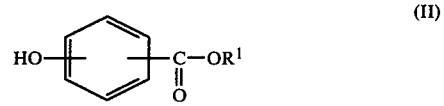

wherein X is —O—, —SO$_2$—, —S— or —CO—, m and n are each 0 or 1, and when p=0, q+r=3 to 600, and when q=r=0, p=3 to 600 and when all of p, q and r are not zero, p+q+r=3 to 600) by (1) bulk polycondensation of a compound represented by the general formula (II):

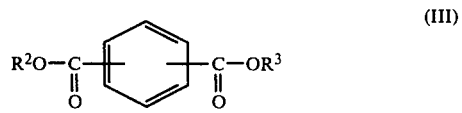

(II)

(wherein R$^1$ is hydrogen, benzyl, a lower alkyl or phenyl), (2) bulk polycondensation of a compound represented by the general formula (III):

(III)

R$^2$O—C—⬡—C—OR$^3$
‖  ‖
O  O (wherein R$^2$ and R$^3$ are individually hydrogen, benzyl, a lower alkyl or phenyl) with a compound represented by the general formula (IV):

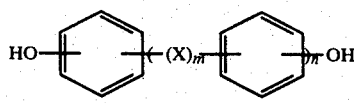

(wherein X, m and n are as defined above), or (3) bulk condensation of compounds (I), (II) and (III), the improvement which comprises using three reaction vessels, reacting the compound specified in steps (1), (2) or (3) with an acid anhydride to effect an alkanolylation reaction in the first reaction vessel to thereby prepare a monomer, removing the acids by-produced in said reaction, forming or not forming an oligomer from a part or whole of said monomer, then transferring the reaction product of the first vessel into the second reaction vessel, polycondensing said monomer and/or oligomer to produce prepolymer in the second reaction vessel, transferring the reaction product of the second vessel into the third reaction vessel, and heating said prepolymer in said third reaction vessel thereby obtaining an aromatic polyester having high polymerization degree.

2. A process according to claim 1, wherein the reaction product in the first reaction vessel has a viscosity of not more than 5,000 poises.

3. A process according to claim 1, wherein a shearing force is applied in the second reaction vessel at a temperature below the fusing temperature of the prepolymer to thereby form a solid dispersion of prepolymer.

4. A process according to claim 3, wherein the solid dispersion of prepolymer transferred from the second reaction vessel is subjected to a solid phase polymerization in the third reaction vessel at a temperature within the range in which no fusion of said prepolymer takes place, thereby increasing the polymerization degree of said prepolymer.

5. A process according to claim 1, wherein the prepolymer produced in the second reaction vessel is pelletized by an extruder and then transferred into the third reaction vessel.

6. A process according to claim 1, wherein at least the second reaction vessel of the three reaction vessels is made of a nickel-molybdenum-iron alloy having a composition comprising 48 to 80% by weight of nickel, 15 to 35% by weight of molybdenum and 1 to 10% by weight of iron.

* * * * *